United States Patent Office 3,269,972
Patented August 30, 1966

3,269,972
BUTYL RUBBER COMPOSITIONS COMPRISING METHYL HYDROXY STEARATE
Sholom A. Banks, Roselle Park, David R. Hammel, Colonia, and Conrad J. Jankowski, Metuchen, N.J., assignors to Esso Research and Engineering Company, a corporation of Delaware
No Drawing. Filed Oct. 5, 1960, Ser. No. 60,580
5 Claims. (Cl. 260—32.2)

The present invention is concerned with rubbery isoolefin-multiolefin copolymer compositions and means for recovery of said copolymers after copolymerization. More particularly, it deals with butyl rubber-type polymer compositions containing methyl hydroxy stearates and the use of methyl hydroxy stearate as a slurry aid in the recovery of such polymers.

Butyl rubbers are well known in the rubber art, e.g., chapter 24 in "Synthetic Rubber," edited by G. Whitby. The term "butyl rubber" denotes a rubbery copolymer comprising a major proportion of a monoolefin having 4 to 7 carbon atoms and a minor proportion of a multiolefin having 4 to 8 carbon atoms. The most commonly employed monoolefin is isobutylene, although other monoolefins such as 3-methyl-butene-1 and 4-methyl-pentene-1 may be used. Suitable multiolefins, which are generally conjugated diolefins, include isoprene, butadiene-1,3, dimethyl butadiene-1,3, piperylene, and the like. Most of the copolymers contain about 85 to 99.5 wt. percent isoolefin and 0.5 to 15 wt. percent diolefin, which in most instances is isoprene. The polymerization is generally carried out at a low temperature, e.g., between −50 and −165° C., in the presence of a Friedel-Crafts catalyst, such as aluminum trichloride, dissolved in a lower alkyl halide, such as methyl chloride, ethyl chloride, etc. Their preparation is fully described in U.S. Patent 2,356,128. Butyl rubbers have a viscosity average molecular weight between about 200,000 and 1,500,000 or more and a mole percent unsaturation between about 1 and 30.

In many applications for butyl rubber, e.g., washing machine boots, boat dock bumpers, tire sidewalls, etc., it is highly desirable to have a vulcanization recipe that is readily released from the article-forming mold, and which will have a reduced surface friction in actual use. As will be appreciated, although rubbers in general provide a substantial degree of surface friction, in the uses described above the rubber article would be rapidly eroded unless the surface friction were reduced.

It has now been found that the surface friction and general processing characteristics of butyl rubber type polymers are greatly improved by incorporating 0.15 to 25, preferably 1.0 to 15, wt. percent based on rubbery polymer of methyl hydroxy stearate into the copolymer mixture.

In one embodiment of the present invention, methyl hydroxy stearate is compounded directly into butyl rubber recipes to be subjected to vulcanization.

In another embodiment of the present invention, the methyl hydroxy stearate is employed as a slurry aid during the recovery of the butyl polymer from the copolymerization reaction. As is well known in the art, e.g., see pages 846 to 848 of "Synthetic Rubber," by Whitby, etc., the copolymerization reaction to form butyl rubber is carried out in a diluent such as methyl chloride, fluorinated hydrocarbons or methylene chloride. The polymer in the form of very fine particles emerges from the reactor as a slurry and the slurry is passed into a flash zone wherein unreacted feed components and diluent may be removed. Conventionally, a small quantity of zinc stearate is injected into the flash tank to prevent agglomeration in the resulting hot-water polymer slurry, which is then sent to drying, and further processed, e.g., extruded, etc. In this embodiment of the present invention, the methyl hydroxy stearate is employed as a slurry aid in place of zinc stearate or alkaline earth metal stearates such as calcium stearate. Normally, about 0.01 to 25, preferably 0.1 to 15, wt. percent of methyl hydroxy stearate based on polymer is added to the aqueous slurry of butyl rubber. This can be done in various ways. The methyl hydroxy stearate may be incorporated into the reaction mixture going into the flash tank, introduced into the already formed water slurry of butyl in or after the flash system, or be present in the aqueous media initially used to contact the polymer reaction mixture. Thus after drying and processing, the recovered butyl rubber will contain minor proportions of methyl hydroxy stearate.

It is to be clearly understood that the use of methyl hydroxy stearate affords substantial advantages over butyl compositions containing metallic stearates such as zinc stearate, calcium stearate, etc. The present compositions have substantially less surface friction than such prior art compositions as well as being more economical.

Compositions of the present invention may be cured under a broad range of temperatures, e.g., 200 to 450° F., preferably 280 to 400° F., as well as under various conditions, e.g., open steam heating, oven curing, curing extrusion or molding, etc. The curing period may vary from about 5 minutes to several hours, it preferably being 4 to 60 minutes.

Various conventional curatives, and combinations thereof may be employed. Examples of suitable curing agents are sulfur, thiuram disulfides, thiocarbamates, zinc oxide, p-quinone dioxime, sulfur donating agents, etc. Vulcanization recipes prepared in accordance with the present invention may contain various additional materials such as carbon black, mineral fillers, pigments, antioxidants, extender oils, antitack agents, etc. If desired, blends of butyl rubber containing methyl hydroxy stearate and other rubbers, e.g., natural rubber, neoprene, butadiene-styrene polymers, etc., may be covulcanized.

Although the incorporation of methyl hydroxy stearate has been described particularly with respect to butyl rubber, it may be incorporated in compositions of halogenated derivatives of butyl rubber in much the same manner as described above. Halogenated butyl rubber-type copolymers are produced by halogenating butyl rubber in a manner which does not substantially degrade its molecular weight, but however gives a rubbery product of substantially different properties than the unhalogenated material. Butyl rubber may be halogenated at temperatures of −50 to 200° C., preferably 0 to 100° C., at pressures of 0.5 to 900 p.s.i.a. with suitable halogenating agents such as gaseous chlorine, liquid bromine, iodine monochloride, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a nonsolvent at about 0 to 180° C., spray drying, or by flashing off the hydrocarbon solvent by injection into a hot water bath.

Preferably, the degree of halogenation is carefully regulated so that the halogenated copolymer contains at least 0.5 wt. percent of combined halogen, but not more than about one atom of combined fluorine or chlorine per double bond in the polymer, nor more than three atoms of combined bromine or iodine per double bond. A more detailed description of the formation of chlorinated butyl rubber may be had by referring to coassigned Serial No. 512,182, filed May 31, 1955, now U.S. Patent No. 2,944,578, July 12, 1960.

The halogenated copolymer has a viscosity average molecular weight of about 100,000 to 2,000,000, and a mole percent unsaturation of between 0.1 to 20, preferably less than 10.

If desired, in a manner similar to that described relative to unhalogenated butyl rubber, the methyl hydroxy stearate may be used as a slurry aid in the recovery of the halogenated copolymer. Typically, after halogenation the halogenated polymer in an inert solvent such as a $C_5$ to $C_{10}$ hydrocarbon is contacted with steam and hot water to slurry the resulting halogenated polymer in aqueous suspension, the polymer thereafter being recovered by dewatering, degassing, etc. In order to avoid agglomeration of the halogenated butyl particles in the aqueous suspension, in accordance with the present invention, methyl hydroxy stearate, e.g., 1 to 10 wt. percent based on halogenated butyl, may be used as a slurry aid. A more detailed description of the recovery of halogenated butyl may be had by reference to coassigned Serial No. 642,675, filed February 27, 1957, now U.S. Patent No. 2,958,667, November 1, 1960.

In addition to curing recipes previously noted, halogenated butyl rubber recipes may be cured with the following curatives: tellurium diethyl dithiocarbamate, dithiocarbamates in conjunction with sulfur donors such as morpholine, xanthogen or thiuram disulfide, thiazoles, thiocarbamates alone, etc. In recipes containing high carbon loadings, the recipe is preferably heat treated with a promoter such as a dinitrossoaniline (advantageously in the presence of fine talc, e.g., Mistron Vapor talc) prior to compounding for curing.

The various aspects and modifications of the present invention will be made more clearly apparent by reference to the following description and accompanying examples.

EXAMPLE 1

To illustrate an embodiment wherein methyl hydroxy stearate is employed as a slurrying aid, a typical lab scale system will be described. The described procedure is illustrative of, rather than limiting, the types of operations falling within the scope of the present invention.

A butyl rubber copolymer of isobutylene and isoprene is prepared in a four-inch diameter copper reactor externally cooled to −90° C. The reactor diluent is about 910 grams of methyl chloride, and the reactants comprise 6.2 grams of isoprene and 200 grams of isobutylene. A fine stream of catalyst solution (0.244 gr. AlCl₃ per 100 ml. of methyl chloride-catalyst solution) is sprayed into the vigorously stirred cold feed until 90% of the olefin feed is converted to polymers, e.g., 5 minutes. The polymer contains about 97 wt. percent isobutylene, 3 wt. percent isoprene, has a mole percent unsaturation of about 3 and a viscosity average molecular weight of about 400,000 to 500,000. After the polymerization is thus completed, the cold rubber polymer-diluent slurry is discharged into a flash zone containing hot water (90° C.) and about 1.82 grams of methyl hydroxy stearate (about 1 wt. percent based on polymer), thus forming a water slurry of the polymer while flashing off the methyl chloride and any unreacted monomers. The aqueous slurry may also contain an antioxidant such as 0.1 to 1.0 wt. percent of phenyl-beta-napthylamine.

The aqueous polymer slurry formed is then subjected to heating and/or filtration to separate a wet polymer crumb containing methyl hydroxy stearate, the crumb normally then being dried such as by dry milling for 10 minutes at 150° C. If desired, additional methyl hydroxy stearate may be added to the polymer crumb to be compounded for curing.

EXAMPLES 2 TO 5

To illustrate that both unhalogenated and halogenated rubber compositions containing methyl hydroxy stearate have reduced surface friction, the following experiments are described.

Both a typical halogenated butyl rubber, denoted "halogenated butyl rubber A," and an unhalogenated isoolefin-multiolefin copolymer, denoted "butyl rubber X," were compounded with conventional fillers and compounding agents as shown in Table II. Halogenated butyl rubber A and butyl rubber X were characterized as follows:

*Table 1*

|  | Halogenated Butyl Rubber A | Butyl Rubber X |
|---|---|---|
| Weight percent isobutylene | 97 | 98.25 |
| Weight percent isoprene | 1.8 | 1.75 |
| Weight percent chlorine | 1.2 |  |
| Viscosity average molecular weight | 400,000 | 480,000 |
| Mole percent unsaturation | 1.8 | 1.75 |

In samples 3, 4, 6 and 7, the composition also contained methyl hydroxy stearate, whereas the other sample either contained no stearate (samples 2 and 5) or a conventional slurrying aid, zinc stearate (samples 8 and 9). After compounding, each composition was cured for 15 minutes at 310° F. and the vulcanizates tested for surface friction by the Model 3 Egan Slip Tested (Thwing-Albert Instrument Company, Philadelphia, Pa.), consisting of:

(1) Cover plate.
(2) Infinitely variable transmission from 0 to 40 inches per minute.
(3) Speed indicator (coarse adjustment).
(4) Speed indicator (vernier, fine adjustment).
(5) Moving platform to which one surface to be tested is attached.
(6) Sled around which the second surface to be tested is attached.
(7) Load cell.
(8) Spirit level.
(9) Control panel with switches, rheostats, etc., labeled
  Recorder—On, Off   Fuse
  Chart—On, Off   Motor—On, Off
  Range—1000; 500–2000   Pilot
  Zero—Adjust
(10) Model L–50 Sentronic Recorder.
(11) Sight hole for oil level in transmission.

To sled (6) is attached a sample of the material to be tested, in this case a sheet of vulcanized compound 0.075 inch in thickness. Sled (6) with sample attached is placed on platform (5) to which has been attached a sample of material against which coefficient of friction is to be measured, in this case either an aluminum sheet or unlacquered maple wood slab. Hook of load cell (7) is connected to eye on sled (6). Motor switch on control panel (9) is placed in "on" position with infinitely variable transmission (2) having been previously set to desired speed by means of speed indicators (3) and (4), in this case 15 inches per minute. As slack in load cell (7) cable is taken up, chart drives switch on control panel (9) is placed in on position. The resultant trace on chart is a measure of static and kinetic frictions.

The coefficient of friction is calculated by dividing the maximum recorded load by the weight of the sled. The sled in this instance weighed 518 grams. The distance of travel of the platform (5) was 10 inches, with the average recorded reading over this distance used to calculate the coefficient of friction, in this case kinetic, which is the frictional resistance during sliding between two materials.

"Paricin 1" is a trade name for methyl hydroxy stearate. Paricin 1 has a molecular weight of 312 and is a white waxy solid in the form of short flat rods. It has approximately the following properties:

PHYSICAL AND CHEMICAL PROPERTIES

| | |
|---|---|
| Acid value | 3 |
| Sapon. value | 179 |
| Iodine value | 3 |
| Hydroxyl value | 170 |
| Melting point, ° C. | 51 |
| Flash point, COC, ° F. | 415 |
| Fire point, COC, ° F. | 435 |

*Table II*

| Sample | 2 | 3 | 4 | 5 | 6 | 7 | 8 | 9 |
|---|---|---|---|---|---|---|---|---|
| Halogenated butyl rubber A | 100 | 100 | 100 | | | | 100 | |
| Butyl rubber X | | | | 100 | 100 | 100 | | 100 |
| Maglite K (magnesium oxide) | 0.25 | 0.25 | 0.25 | | | | 0.25 | |
| EPC black | 60 | 60 | 60 | 60 | 60 | 60 | 60 | 60 |
| MT black | 20 | 20 | 20 | 20 | 20 | 20 | 20 | 20 |
| Stearic acid | 1 | 1 | 1 | 1 | 1 | 1 | 1 | 1 |
| Faxam 40 (process oil) | 10 | 10 | 10 | 10 | 10 | 10 | 10 | 10 |
| KP-140 (tributoxy ethyl phosphate) | 2 | 2 | 2 | 2 | 2 | 2 | 2 | 2 |
| Zinc stearate | | | | | | | 5 | 5 |
| Zinc oxide | 5 | 5 | 5 | 5 | 5 | 5 | 5 | 5 |
| Sulfur | 1.5 | 1.5 | 1.5 | 1.5 | 1.5 | 1.5 | 1.5 | 1.5 |
| Tetrone A (dipentamethylene-thiuram tetrasulfide) | 1.0 | 1.0 | 1.0 | | | | 1.0 | |
| Methyl tuads (tetramethyl-thiuram disulfide) | | | | 1.0 | 1.0 | 1.0 | | 1.0 |
| Zenite (zinc salt of 2-mercapto-benzothiazole) | | | | 1.0 | 1.0 | 1.0 | | 1.0 |
| Captax (2-mercaptobenzothiazole) | | | | 1.0 | 1.0 | 1.0 | | 1.0 |
| Methyl hydroxy stearate (Paricin 1) | | 5 | 10 | | 5 | 10 | | |
| Coefficient of friction: | | | | | | | | |
| Against unlacquered maple wood | 1.16 | 0.50 | 0.43 | 1.08 | 0.62 | 0.46 | 0.96 | 1.01 |
| Against aluminum plate | 0.48 | 0.39 | 0.35 | 1.62 | 0.85 | 0.54 | 1.12 | 1.35 |

As shown in Table II, butyl rubber and halogenated butyl rubber vulcanizates containing methyl hydroxy stearate (samples 3, 4, 6 and 7) exhibited substantially less surface friction than compositions containing either no stearate (samples 2 and 5) or conventional zinc stearate (samples 8 and 9). Thus, the compositions of the present invention offer particular advantages in applications wherein sliding contact of rubber to another surface is desired, such as washing machine mechanism boots, valve diaphragms, conveyor belts, transmission belts, etc.

Having described the present invention, that which is sought to be protected is set forth in the following claims.

What is claimed is:

1. A composition comprising a rubbery copolymer of 85 to 99.5 wt. percent of a $C_4$ to $C_8$ isomonoolefin and 15 to 0.5 wt. percent of a $C_4$ to $C_{14}$ conjugated diolefin, and 0.05 to 25.0 wt. percent based on rubbery copolymer of methyl hydroxy stearate.

2. The composition of claim 1 wherein said copolymer is a halogenated copolymer.

3. A vulcanizate having the composition of claim 1.

4. A composition comprising a rubbery copolymer of 85 to 99.5 wt. percent of a $C_4$ to $C_8$ isomonoolefin and 15 to 0.5 wt. percent of a $C_4$ to $C_{14}$ conjugated diolefin, and 1.0 to 15 wt. percent based on rubbery copolymer of methyl hydroxy stearate.

5. The composition of claim 4 wherein said copolymer is a halogenated copolymer containing at least 0.5 wt. percent halogen but no more than three atoms of halogen per double bond in the copolymer.

References Cited by the Examiner

UNITED STATES PATENTS

| | | | |
|---|---|---|---|
| 2,368,522 | 1/1945 | Cornell et al. | 260—757 |
| 2,694,692 | 11/1954 | Amos et al. | 260—23.7 |
| 2,821,515 | 1/1958 | Jaros | 260—33.6 |
| 2,955,102 | 10/1960 | Clayton et al. | 260—33.6 |
| 2,956,035 | 10/1960 | Mock | 260—23 |
| 2,958,667 | 11/1960 | Eby et al. | 260—23.7 |
| 3,031,423 | 4/1962 | Meier | 260—23.7 |
| 3,081,276 | 3/1963 | Snyder et al. | 260—33.6 |

OTHER REFERENCES

Doolittle, "The Technology of Solvents and Plasticizers," pages 912, 913, 945 and 947, John Wiley & Sons, Inc., New York, 1954.

LEON J. BERCOVITZ, *Primary Examiner.*

A. D. SULLIVAN, *Examiner.*

R. W. GRIFFIN, T. D. KERWIN, R. A. WHITE,
*Assistant Examiners.*